May 21, 1963   M. A. BRIGGS   3,090,414
APPARATUS FOR CUTTING AND PLANTING SEED POTATOES
Filed June 23, 1961   2 Sheets-Sheet 1

INVENTOR
MERLE A. BRIGGS
BY Smart & Biggar
ATTORNEYS.

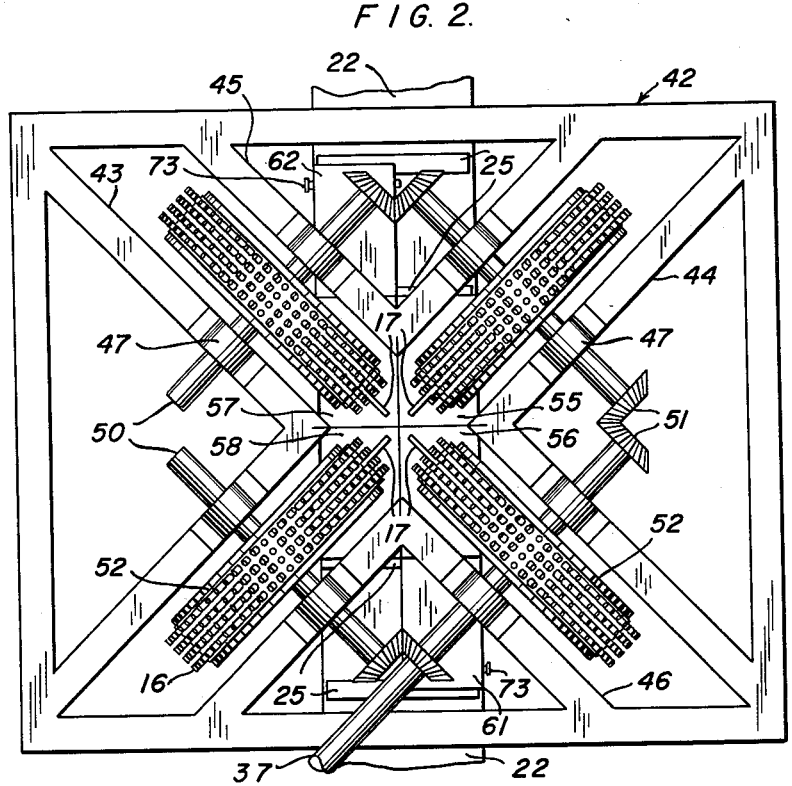
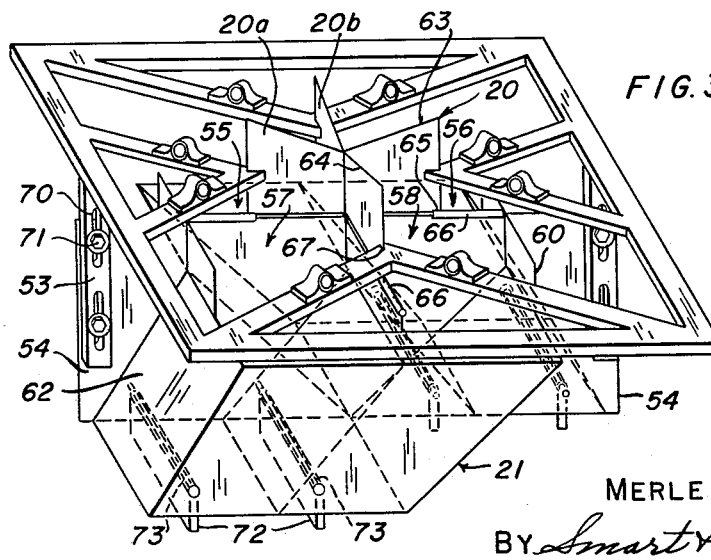

3,090,414
APPARATUS FOR CUTTING AND PLANTING SEED POTATOES
Merle A. Briggs, R.R. 2, Plaster Rock, New Brunswick, Canada
Filed June 23, 1961, Ser. No. 119,090
5 Claims. (Cl. 146—59)

This invention relates to an improved apparatus for cutting seed potatoes.

According to the conventional manner of planting seed potatoes, the potatoes to be used for planting are cut into seed pieces known as sets, either by hand or by a stationary machine. Cutting of the potatoes, whether it be by hand or by machine, is done in a potato house or barn in which the seed pieces are stored until a sufficient number are accumulated to commence planting. At this time, the seed pieces are taken to the planting field and placed in the hopper of a conventional tractor drawn potato planter. The tractor is then drawn over the planting field, a furrow is opened in the ground, potato seed pieces and fertilizer are dropped into the open furrow and the furrow then closed over the seed pieces. This is a conventional method of planting either table stock or certified seed potatoes.

There is a type of potato, however, which commands a higher price than the type produced by the procedure described above. These are foundation seed potatoes which are planted as tuber units. According to the tuber unit method of planting, it is necessary that all of the seed pieces from one potato, or tuber, be planted successively in a single row, with the pieces being planted about eight to ten inches apart. In other words, care must be taken that all of the seed pieces from one tuber are planted successively without intermingling with any seed pieces of another tuber. This is an essential feature of tuber unit planting as it permits highly efficient disease control which is not possible when conventional potato planting methods are followed. For example, if the tuber unit planting method is followed and virus disease or any other irregularities show up in one plant, the plants which were produced from the same tuber may be pulled out or rogued, and it is known that the virus disease from that particular tuber will not show up elsewhere in the field. In order to ensure that proper disease control steps have been taken, the tuber unit fields are inspected regularly during the growing season by Government officials.

In the tuber unit method of planting, cutting has previously been done by hand. According to one method a number of labourers walk along in the planting field cutting a supply of tubers into equal sized seed pieces and planting as they cut. In a second method several labourers ride on a tuber unit planter cutting the tuber by hand and feeding each seed piece into the planter in its proper order. This method is faster than the former since the vehicle is usually tractor drawn.

When planting potatoes either by the conventional method or by the tuber unit method, difficulties have traditionally been encountered in obtaining properly cut seed pieces. It is desirable that each seed piece contain at least one eye since only such seed pieces will produce a plant, and it is naturally of interest to the planter to produce as large a number of plants as possible in a given field in order to maximize the yield per unit of area. As is known in the art, desirable results are more likely to occur if the potato is cut lengthwise in equal sections since certain potato varieties possess slow germinating or weak stem-end eyes which may not germinate, and the lengthwise cutting ensures that every seed piece contains a quarter of the end remote from the undesirable stem end. Known potato cutting machines do not achieve this result, and although it can be obtained by hand cutting, this method is comparatively slow and, in practice, the seed pieces produced are often not of equal size.

One type of stationary machine which is used in potato houses or barns employs a pair of crossed, mutually perpendicular potato cutting knives and a group of four wheels having metal rims and smooth surfaced balloon tires which are disposed symmetrically about the point of intersection of the two knives, and which are adapted to rotate at a fixed speed whereby to grip a potato and drive it down onto the blades. An example of such a known machine is disclosed in United States Patent No. 2,705,986, issued to Clifford C. Wetzel on April 12, 1955. The type of machine disclosed in this patent is not adapted to center the potato over the crossed cutting knives or orient the potato in any particular fashion, but merely forces the potato onto the blades in the same position as it is received by the wheels. Because of this, the potato is often cut in sections of unequal size and the cuts do not consistently run lengthwise of the potato as is desirable in order to increase the probability of obtaining a germinating eye in each seed piece. Because the wheels are covered with a smooth rubber outer surface, a considerable amount of slippage occurs between such surface and the surface of the potato. This is greatly accentuated when the potato is wet with the result that the wheels are unable to force the potato down onto and past the cutting knives. In the result, the machine becomes jammed and undue delay is caused by stopping the machine in order to correct the failing. Another result of the failure of the rubber tires to positively grip the potato is the irregularity of the time interval between the cutting of successive potatoes. This irregularity is particularly detrimental to potato planting by the tuber unit method as, in such method, the seed pieces must be dropped successively and planted in adjacent spaces while the planter is traversing the field. Consequently, any irregularity in cutting the tubers, would result in improper spacing of the seed pieces and might result in overlapping in the spacing of seed pieces produced from different tubers. For example, under ideal conditions, every seed piece of each tuber should be deposited in the ground successively to produce a row consisting of seed pieces of one tuber only. However, if the wheel slips on one tuber and fails to force it past the cutting knives, a second tuber will be deposited between the wheels when the first tuber is yet uncut. It is therefore possible for the two tubers to be forced past the cutting knives in rapid succession rather than at spaced intervals, resulting in intermingling of the seed pieces of each tuber on the ground.

Another type of stationary potato cutter is exemplified by United States Patent No. 2,722,256, issued to J. E. Hise on November 1, 1955. This cutter employs a pair of mutually perpendicular crossed cutting blades and two pairs of opposed feeding wheels carrying hobnail-like protuberances on their peripheral surfaces, each pair of opposed feeding wheels lying in a common plane which bisects opposite angles formed by the mutually perpendicular cutting blades. The feeding wheels are rotatably mounted on posts which are pivotally and resiliently mounted to urge the feeding wheels inwardly toward each other with equal force. Potatoes are fed onto and past the cutting blades by the frictional action of the hobnail-like protuberances on the surfaces of the potatoes; however this apparatus is not adapted to orient the potatoes in an endwise relationship with respect to the cutting blades, and as a result there is no certainty that the potatoes will be cut in a lengthwise manner as is the object of the instant invention. The springs which resiliently urge the feeding wheels toward one another will weaken with use and, since the potatoes are forced past the cutting blades by the frictional action of the wheel peripheries on the potatoes, slippage is liable to occur causing the previously described disadvantages. In addition, because of the resilient mounting of the feeding wheels, the apparatus lacks the rigidity desirable for high speed operation.

I have found that the above disadvantages inherent in manual or known mechanical means for cutting tubers, may be overcome by providing the combination of a horizontally disposed frame member, a knife blade supported by said frame member and having a cutting edge arranged to cut a potato symmetrically into longitudinal sections, a plurality of bearing members rigidly secured to said frame, a plurality of vertically situated, rotatable wheels journalled in said bearing members with their axes of rotation lying in a common plane at about the same level as said cutting edge, said wheels being symmetrically arranged and radially disposed with their vertical centre planes intersecting along a common vertical line, a plurality of resiliently flexible, elongated potato orienting fingers projecting radially outwardly from the peripheral surfaces of said wheels, said fingers being sufficiently rigid to exert a lateral force on a potato situated between said wheels to position it symmetrically above said cutting edge with its longitudinal axis substantially coextensive with said common vertical line and sufficiently flexible to permit said cutting edge to support the potato when the latter is being so oriented, a rigid projection extending radially outwardly from the peripheral surface of at least one wheel a distance slightly less than the shortest distance between the wheel and said common vertical line and adapted to force a potato past said cutting edge whereby to cut a potato symmetrically into longitudinal sections on rotation of the wheel, and power means operatively connected with said wheels to rotate them such that their peripheral portions nearest said common vertical line move downwardly at the same speed.

This apparatus may be especially adapted to the planting of potatoes by the tuber unit method by the addition of means for separating the seed pieces and delivering these seed pieces successively to the ground at spaced intervals.

In the drawings which ilustrate embodiments of the invention:

FIGURE 2 is a plan view of the preferred embodiment of the potato cutter illustrated in FIGURE 1; and FIGURE 3 is a pictorial representation of the mounting of the cutter blades together with the separator unit adapted to separate the seed pieces of each tuber.

Figure 1:
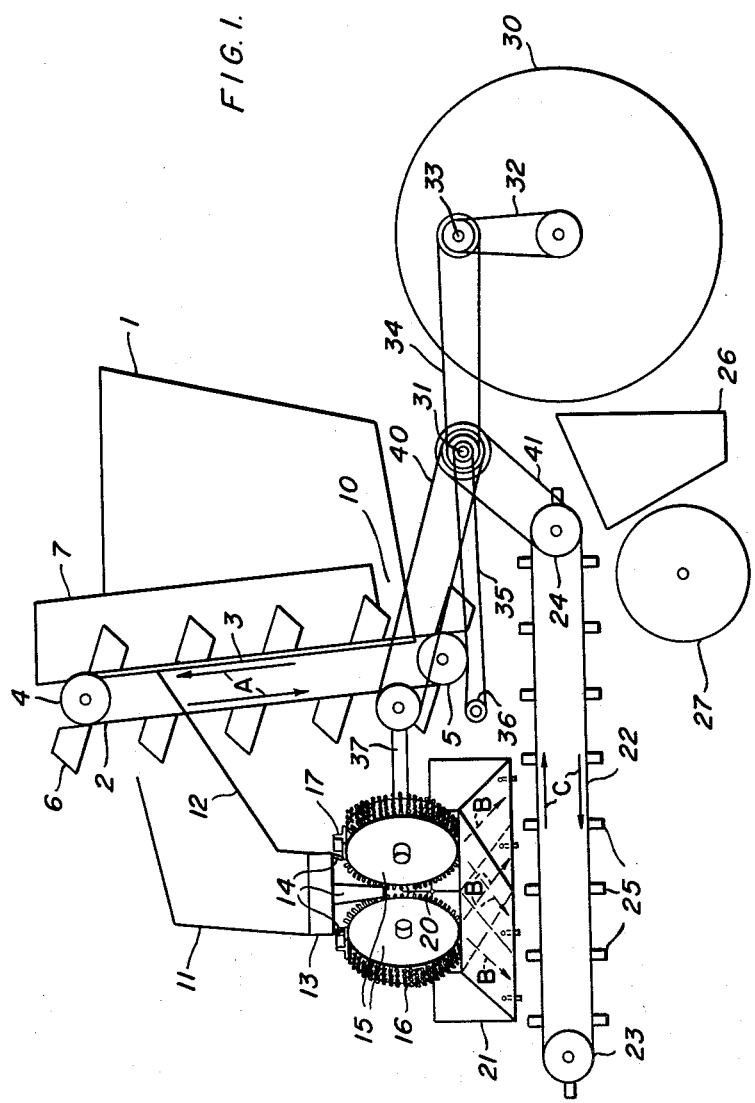
FIGURE 1 is a schematic side view of a preferred embodiment of the potato cutter of the invention in combination with apparatus for feeding whole potatoes to the cutter and apparatus for planting the seed pieces in the ground.

As shown in FIGURE 1, the potato planter unit incorporating the potato cutter of the invention comprises a potato storage hopper 1 and an endless belt 2 situated at the rearward surface 3 of storage hopper 1 and passing around rotatable wheels 4 and 5. Belt 2 has potato receiving buckets 6 attached thereto and travels in the direction indicated by the arrows A such that the portion of the belt moving upwardly passes through an opening in the bottom of storage hopper 1 and along the interior of rearward surface 3 thereby enabling each potato receiving bucket to pick up one potato from the storage hopper. Potatoes in the storage hopper may be prevented from dropping through the opening, through which belt 2 passes, by any suitable means, for example, a flexible rubber flap which normally extends over the opening but which may be forced upwardly to allow a bucket to pass therethrough. To ensure that each potato receiving bucket retains only a single potato, the upper rim of the bucket slopes downwardly toward the front of storage hopper 1 so that when a potato is picked up by the bucket, a second potato will not rest on top of the first potato and lean against the conveyor belt to be carried upwardly, but will roll on the sloping upper rim of the bucket and fall to the bottom of the hopper.

The bottom of the hopper preferably slopes rearwardly as indicated in FIGURE 1 so that the potatoes will be fed down towards the potato receiving buckets when there are relatively few potatoes left in the storage hopper. The bottom surface of the hopper may also be triangular in shape with one apex located at the rear so that even the last potato in the hopper will be directed to one of the potato receiving buckets.

In order to prevent interference with the operation of belt 2 and buckets 6, by the potatoes stored in the hopper when the hopper is full, a shield 7 may be attached to the interior of rearward surface 3 such that the belt 2 and potato receiving buckets are isolated from the potatoes stored in the hopper with the exception of a space 10, near the bottom of the hopper, which allows the potato receiving buckets to pick up potatoes as they pass upwardly through the opening in the bottom of the hopper.

Situated to the rear of potato storage hopper 1 and positioned to receive potatoes which are reelased from potato receiving buckets 6 as they have passed over wheels 4, is a gravity feed chute 11. Chute 11 has an opening in its bottom surface 12, similar to that in the bottom of storage hopper 1, to permit belt 2 and buckets 6 to pass therethrough. Affixed to the outlet of feed chute 11 is a reinforcing ring 13 having four downwardly depending potato guiding fingers 14 adapted to direct the potatoes into the space defined by the peripheries of potato gripping wheels 15.

Four power driven rotatable potato gripping wheels 15 are located below the outlet of gravity feed chute 11. These wheels form a symmetrical arrangement and are so positioned with respect to guiding fingers 14 that each guiding finger extends between adjacent potato gripping wheels. The peripheral surface of each potato gripping wheel is covered with a plurality of flexible fingers 16 which project radially outwardly therefrom together with an outwardly extending rigid projection 17. Situated in the space defined by the peripheries of the gripping wheels 15, and extending between adjacent gripping wheels is a blade unit 20 which is supported on top of a separator unit 21 which includes two pairs of downwardly directed chutes. The blade unit and chutes are to be more fully described in conjunction with FIGURE 3, the chutes being schematically illustrated in FIGURE 1 by arrows B.

Located below separator unit 21 is a seed spacer belt 22 which passes around wheels 23 and 24 and which is divided into a plurality of compartments by regularly spaced transverse dividers 25. The distance between transverse dividers 25 is approximately the same as the distance between the forward and rearward edges of the bottom of a separator chute, and each compartment formed on seed spacer belt 22 by transverse dividers 25 is adapted to receive a seed piece deposited from one of the separator chutes. Below the forward end of seed spacer belt 22 is located a delivery chute 26 which is adapted to receive seed pieces from seed spacer belt 22 and to deposit the seed pieces into a furrow which has been formed by furrow opening wheels, which are not shown in the drawings but which may be mounted either on the potato planter itself or upon the vehicle which draws it. To the rear of delivery chute 26 are located two furrow closing wheels 27 which cover up the seed pieces after they have been deposited in the furrow.

The planter is mounted on wheels 30 and is adapted to be easily pulled by a tractor or any other suitable vehicle. All movable and rotatable elements are actuated from main drive shaft 31 which in turn is rotated by main wheel 30 through drive 32, axle 33 and drive 34. It will be understood that the term "drive," as used in this application means a power transmitting system consisting of an endless belt or chain which passes over at least two rotatable pulleys or cog wheels. Endless belt 2 is actuated by means of drive 35 which passes over idler wheel 36 and which rotates wheel 5. Potato gripping wheels 15 are actuated through an appropriate gear train (as illustrated in FIGURE 2) by shaft 37 which is itself rotated by drive 40, again through appropriate gearing which is illustrated in FIGURE 2 and which will be described in detail later. Spacer belt 22 is actuated through drive 41. It will be evident that the rate of speed of the various moving components may be altered individually or in total simply by adjusting the ratio of the various drive systems by varying the pulley or cog diameter of the drive system to be altered.

Turning now to FIGURES 2 and 3 of the drawings, the potato cutter and separator combination will be described in greater detail. As seen in FIGURE 2, the cutter and separator combination is mounted on a rectangular frame 42 having V-shaped frame members 43 and 44 extending inwardly from the sides thereof and V-shaped frame members 45 and 46 extending inwardly from its rear and forward edges respectively. A bearing 47 is mounted on each leg of each V-shaped frame member and corresponding pairs of bearings receive axles 50 on which are mounted the gripping wheels 15 for rotation between parallel legs of adjacent V-shaped frame members. Axles 50 are inter-connected through bevel gears 51 which are fixed to the ends thereof whereby the four gripping wheels 15 are rotated at the same speed by means of shaft 37 which is connected to the power source as previously described.

The peripheral surfaces of gripping wheels 15 are covered with rubber or the like as indicated at 52 and extending radially outwardly from covering 52 are long, flexible, tapering fingers 16 which may also be of rubber or other suitable material. In addition, each gripping wheel 15 carries a rigid projection 17 extending outwardly from the peripheral surface thereof. These projections may be of T-shaped cross-section, as illustrated in FIGURE 1, in which case the cross member of the T may be affixed to the peripheral surface of the wheel by suitable fastening means, such as screws, bolts, etc. The rigid projections 17 are so located on the peripheral surface of the wheels 15 that when the wheels are rotated through the gear system previously described, the rigid projections 17 will rotate in phase with each other, that is, when the projection on one wheel has reached the highest point of its travel, the projections on all the other wheels will also be at their highest point of travel, and when the projection of one wheel is nearest the symmetrical center of the space defined by the peripheries of wheels 15, the projection on each other wheel will also be at a point closest to this symmetrical center as illustrated in FIGURE 2.

Located below rectangular frame member 42 and movably connected thereto through downwardly depending slotted frame members 53 is separator chute unit 21. Separator chute unit 21 comprises a center plate 54 forming a common side for pairs of chutes 55, 56 and 57, 58, which are disposed respectively on either side thereof. These chutes are of a rectangular cross-section and have an initial vertical portion designated as 60 and terminate in a forwardly sloping portion 61 in the case of chutes 55 and 56 and in a rearwardly sloping portion 62 in the case of chutes 57 and 58. The sloping portions of the chutes are arranged in a manner such that the lower rearward edge of chute 55 lies in the same line as the lower forward edge of chute 58 so that the outlets of chutes 57 and 58 lie completely to the rear of the outlets of chutes 55 and 56.

Blade unit 20, which consists of two mutually perpendicular blades 20a and 20b sloping downwardly along their cutting edges 63 and 64 towards their point of intersection, is seated on the upper edges of the common side of chutes 55, 56 and 57, 58. The lower edges of blades 20a and 20b are slidably retained in slots 65 formed in pipe-like members 66 which are attached to the top of the separator chutes. The blades are further slidably retained in slots 67 formed in the apex of each of the V-shaped frame members 43, 44, 45 and 46. According to this construction, the blades are securely held yet easily removable for sharpening, cleaning or replacement, if necessary.

Downwardly depending frame members 53 are provided with slots 70 which are adapted to coincide with holes in center plate 54 so that the center plate may be adjustably attached to frame members 53 by a nut and bolt arrangement 71. It will be readily apparent from this construction that nut and bolt arrangement 71 may be loosened and the separator chute unit adjusted in a vertical direction to vary the distance between the top of the separator chutes and the frame 42 on which the potato gripping wheels 15 are mounted. As blades 20a and 20b rest on the top edge of the separator chutes, and as the blades are slidably retained in slots at 67, the position or relationship of the cutting edges of the blades with respect to the potato gripping wheels 15 may be varied.

In the operation of the overall potato cutting and planting machine, the potato storage hopper 1 is filled with suitable seed potatoes and the machine is drawn over the planting field by means of a tractor and tractor hitch, neither of which are shown in the drawings. When the actual planting is to be started the various drive means, that is, drives 35, 40 and 41, are actuated by clutch means which also is not shown in the drawings. The apparatus is now ready for the cutting and planting of the potatoes. As it is drawn over the ground, belt 2 moves in the direction indicated by arrows A and the potato receiving buckets 6 each pick up a single potato as they pass through the bottom of potato storage hopper 1 and upwardly through the interior of the hopper. As each potato receiving bucket passes over the top of wheel 4 and commences its downward movement, the potato carried by the bucket is dropped into gravity feed chute 11 which delivers the potato, by means of guiding fingers 14, into the space defined by the peripheries of gripping wheels 15.

Flexible fingers 16, on the peripheral surfaces of the symmetrically arranged gripping wheels 15, grip the potato and resiliently urge it towards the center of the area defined by the peripheral surfaces of gripping wheels 15 thereby centering the potato over the two intersecting blades 20a and 20b. In addition, the pressure from flexible fingers 16 acting on the surface of the potato will cause the potato to turn until the pressure from the fingers on opposed wheels is lowest; this will occur when the potato is oriented with its longitudinal axis in a substantially vertical direction since the potato will present its smallest cross sectional area to the gripping wheels in such an orientation. Flexible fingers 16 then hold the potato tightly against the cutting edges of the knife blades in the aforementioned orientation until such time as rigid projections 17 on the gripping wheels 15 contact the upper end of the potato in unison and force it positively down past blade unit 20 thereby cutting the potato into four substantially equal longitudinal sections. Due to the inwardly sloping cutting edges of the blades, the potatoes are cut cleanly and easily by means of a shearing action. Each of the four sections passes into one of delivery chutes 55, 56, 57 and 58 and is directed downwardly such that each section falls into one compartment on seed spacing belt 22. As previously described, each compartment on belt 22 is of a length approximately equal to the distance between the forward and rearward edges of the bottom of a separator chute, with the result that the four sections of one potato are deposited in four adjoining compartments on seed spacing belt 22.

Rigid projections 17 drive the potato past the blade unit very rapidly in order to decrease the possibility of any section of the potato sticking to either the blades or the delivery chute. Consequently, in order to prevent the seed pieces from striking seed spacing belt 22 with such force that the seed pieces will bounce out of the compartment to which they had been delivered, it has been found advantageous to provide flaps 72 at the outlet of each delivery chute. Flaps 72 are freely swingable on axles 73 which are secured to opposite sides of each chute in a conventional manner such that the flaps ordinarily hang freely in a substantially vertical plane. In this manner, the energy of a seed piece travelling rapidly down a chute will be partially absorbed when it strikes the freely swingable flap 72. The seed piece will thus drop onto seed spacing belt 22 with reduced energy, substantially eliminating the possibility of it bouncing out of the compartment to which it has been directed.

After four seed pieces of one tuber have been deposited in four adjoining compartments on the seed spacing belt 22, they are carried by belt 22 which is travelling in the direction indicated by the arrows C, toward the forward end of the apparatus where the seed pieces are successively dropped into the seed delivery chute 26 as spacing belt 22 passes around wheel 24. The seed delivery chute 26 deposits the seed pieces into a furrow which has been opened in the planting field by a suitable furrowing device (not shown) attached either to a tractor drawing the apparatus or the forward part of the apparatus itself. The furrow is then closed to cover the seed by ground closing wheels 27.

In order that the apparatus functions properly, it is necessary that the speed of belt 2 and the speed of rotation of potato gripping wheels 15 be so adjusted, in relation to the speed of seed spacing belt 22, that the time interval between the cutting of successive potatoes in sufficient to permit the four compartments on belt 22, which contain the four seed pieces from one potato, to completely pass under the outlets of delivery chutes 55, 56, 57 and 58 so that the next four adjoining compartments will be positioned under the outlets of the four delivery chutes for the receipt of the four seed pieces from the next potato. It may sometimes be desirable to allow a spacing of one or two or more compartments between the four seed pieces of one potato and four seed pieces of the next potato. It will be understood that this can be accomplished by varying the diameters of the pulleys of drive 41 whereby to vary the rate of travel of seed spacing belt 22. It will be apparent that the rate of travel of belt 2 and the speed of rotation of potato gripping wheel 15 may also be varied by changing the diameter of the pulleys or by altering the number of cogs on the cog wheels associated with drives 35 and 40.

What I claim as my invention is:

1. In apparatus for cutting seed potatoes, a horizontally disposed frame member, a knife blade supported by said frame member and having a cutting edge arranged to cut a potato symmetrically into longitudinal sections, a plurality of bearing members rigidly secured to said frame, a plurality of vertically situated, rotatable wheels journalled in said bearing members with their axes of rotation lying in a common plane at about the same level as said cutting edge, said wheels being symmetrically arranged and radially disposed with their vertical centre planes intersecting along a common vertical line, a plurality of resiliently flexible, elongated potato orienting fingers projecting radially outwardly from the peripheral surfaces of said wheels, said fingers being sufficiently rigid to exert a lateral force on a potato situated between said wheels to position it symmetrically above said cutting edge with its longitudinal axis substantially coextensive with said common vertical line and sufficiently flexible to permit said cutting edge to support the potato when the latter is being so oriented, a rigid projection extending radially outwardly from the peripheral surface of at least one wheel a distance slightly less than the shortest distance between the wheel and said common vertical line and adapted to force a potato past said cutting edge whereby to cut a potato symmetrically into longitudinal sections on rotation of the wheel, and power means operatively connected with said wheels to rotate them such that their peripheral portions nearest said common vertical line move downwardly at the same speed.

2. In apparatus for cutting seed potatoes, a horizontally disposed frame member, two crossed knife blades arranged in cruciform supported by said frame member and having cutting edges adapted to cut a potato symmetrically into four longitudinal sections, a plurality of bearing members rigidly secured to said frame, four vertically situated, rotatable wheels journalled in said bearing members with their axes of rotation lying in a common plane at about the same level as said cutting edges, said wheels being symmetrically arranged between said crossed blades and radially disposed with their vertical centre planes intersecting along a common vertical line through the intersection of said knife blades, a plurality of resiliently flexible, elongated potato orienting fingers projecting radially outwardly from the peripheral surfaces of said wheels, said fingers being sufficiently rigid to exert a lateral force on a potato located between said wheels to position it symmetrically above said cutting edges with its longitudinal axis substantially coextensive with said common vertical line and sufficiently flexible to permit said cutting edges to support the potato when the latter is being so oriented, a rigid projection extending radially outwardly from the peripheral surface of at least one wheel a distance slightly less than the shortest distance between the wheel and said common vertical line and adapted to force a potato past said cutting edges whereby to cut a potato symmetrically into four longitudinal sections upon rotation of the wheel, and power means operatively connected with said wheels to rotate them such that their peripheral portions nearest said common vertical line move downwardly at the same speed.

3. Apparatus as defined in claim 2 wherein each of said wheels is provided with one of said rigid projections, said rigid projections being so situated on said wheels as to move in phase with one another upon rotation of said wheels.

4. Apparatus as defined in claim 3 wherein said knife blades are vertically adjustable with respect to the common plane in which the axes of rotation of said wheels lie.

5. Apparatus as defined in claim 4 wherein four potato receiving chutes are secured to said frame member below said knife blades whereby to receive and separate cut sections of potato.

References Cited in the file of this patent

UNITED STATES PATENTS

| | | |
|---|---|---|
| 1,227,056 | King | May 22, 1917 |
| 1,446,713 | Maceij | Feb. 27, 1923 |
| 2,395,350 | Smith | Feb. 19, 1946 |
| 2,547,702 | Hanna | Apr. 3, 1951 |
| 2,705,986 | Wetzel | Apr. 12, 1955 |
| 2,722,256 | Hise | Nov. 1, 1955 |